July 17, 1951           G. SIEVERS           2,560,747

CROSS-WIND LANDING GEAR FOR AIRPLANES

Filed March 28, 1949           3 Sheets-Sheet 1

INVENTOR.
George Sievers
BY
Philip A. Friedell
Attorney

INVENTOR.
George Sievers
BY
Philip A. Friedell
Attorney

July 17, 1951  G. SIEVERS  2,560,747
CROSS-WIND LANDING GEAR FOR AIRPLANES

Filed March 28, 1949  3 Sheets-Sheet 3

INVENTOR.
George Sievers
BY
Philip A. Friedell
Attorney

Patented July 17, 1951

2,560,747

UNITED STATES PATENT OFFICE 2,560,747

CROSS-WIND LANDING GEAR FOR AIRPLANES

George Sievers, Oakland, Calif.

Application March 28, 1949, Serial No. 83,787

4 Claims. (Cl. 244—100)

This invention relates to improvements in landing gears and especially to elongated types of landing gears such as endless tread or tractor type landing gears, skids or skis, and tandem wheels, and provides a landing gear which can be aligned with the runway for landing or take-off while the airplane is headed at least partly into a cross-wind. This permits landing or take-off from a runway when the wind blows diagonally to the runway, and permits landing on meadows, ranges and farms in the direction providing the best landing stretch or one free of major landing hazards.

With this invention, any airplane having an elongated landing gear, or even single landing wheels, can have the landing gear oriented with respect to the runway or landing strip while the airplane noses into the wind diagonally to the runway or landing strip.

The orientation of the landing gear is at all times under the control of the pilot, so that he can control the angularity in accordance with the instant requirements; the adjustment of the landing gear being under control of a single lever which, when moved in one direction from a central point will move the landing gear in one angular direction, and when moved in the other direction will move it in the other angular direction and to the same degree, and at any time when the lever is brought to center, the gear will be immediately aligned with the axis of the fuselage of the airplane. In fact, for all adjustments, the adjustment will follow the lever movement and be restricted to the specific degree of movement.

With this invention, the effects of cross-winds on taxiing, take-offs and landings can be compensated for under continuous control of the pilot. When the control lever is on center, the landing gear operates in a conventional manner, though, the direction of travel while on the ground is, if desired, controllable by the pilot irrespective of wind direction. Fast movement over ruts, hanger-door saddles or tracks will have no effect irrespective of the degree of angular adjustment because the landing gear is always fixed in its instant position and requires adjustment of the control lever to change the relative angularity. Under normal conditions, with the airplane heading directly into the wind, the control lever is left on neutral and the landing gear then operates in the conventional way with the landing gear in alignment with the axis of the fuselage.

This invention is in part a modification of my application, Serial No. 63,793, filed December 6, 1948, now U. S. Patent No. 2,502,802, issued April 4, 1950, for Landing Gear for Aircraft, and which discloses a landing gear which is retractable and also adjustable relative to the plane of the axis of the aircraft, so that the landing gear can be adjusted to contact the ground through its length irrespective of whether the plane is nosing down or up, while this application adds the novel feature of permitting the landing gear to be angularly adjusted relative to the axis of the fuselage, to compensate for cross-winds and for steering the airplane on the runway or ground.

The objects and advantages of the invention are as follows:

First, to provide means for aligning the landing gear of an airplane with the landing strip or runway while the airplane is headed angularly into the wind to compensate for the effects of cross-winds.

Second, to provide means as outlined which is under instant control of the pilot of the airplane for control of the exact angularity of the landing gear relative to the axis of the airplane.

Third, to provide means as outlined in which adjustment of the landing gear is responsive in exact degree and direction to that of the control means.

Fourth, to provide means as outlined which is unaffected by ruts or obstructions with the landing gear maintaining the exact position to which it is adjusted at the instant.

Fifth, to provide means as outlined in which adjustment of the landing gear is in follow relation to adjustment of the control means with the landing gear axially aligned with the axis of the fuselage when the control means is on center.

Sixth, to provide means as outlined which is simple in construction, simple and positive in operation, and requiring a minimum of parts.

Seventh, to provide means as outlined which is applicable to all types of landing gears, including single and tandem wheels, skids or skis, and endless tread or track-laying types of landing gears.

In describing the invention reference will be had to the accompanying drawings, in which.

Figure 1:
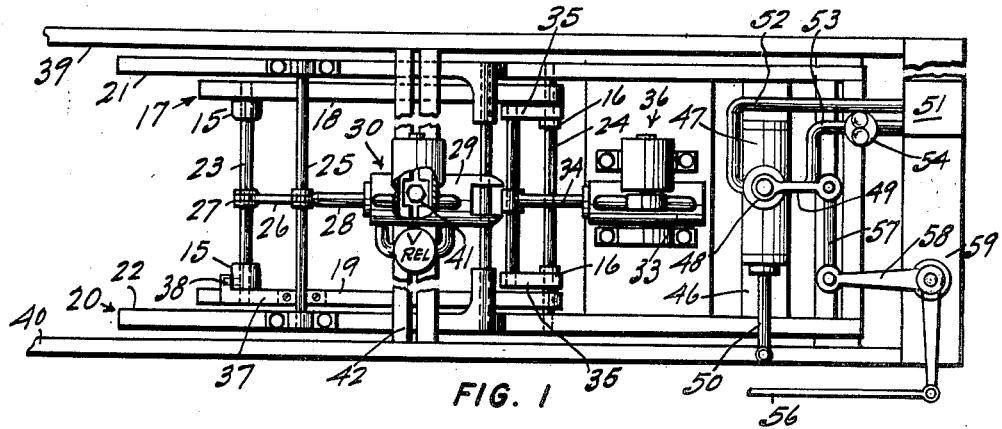
Fig. 1 is a top plan view of the landing gear disclosed in the previously mentioned application, with this invention applied thereto.
Figure 2:
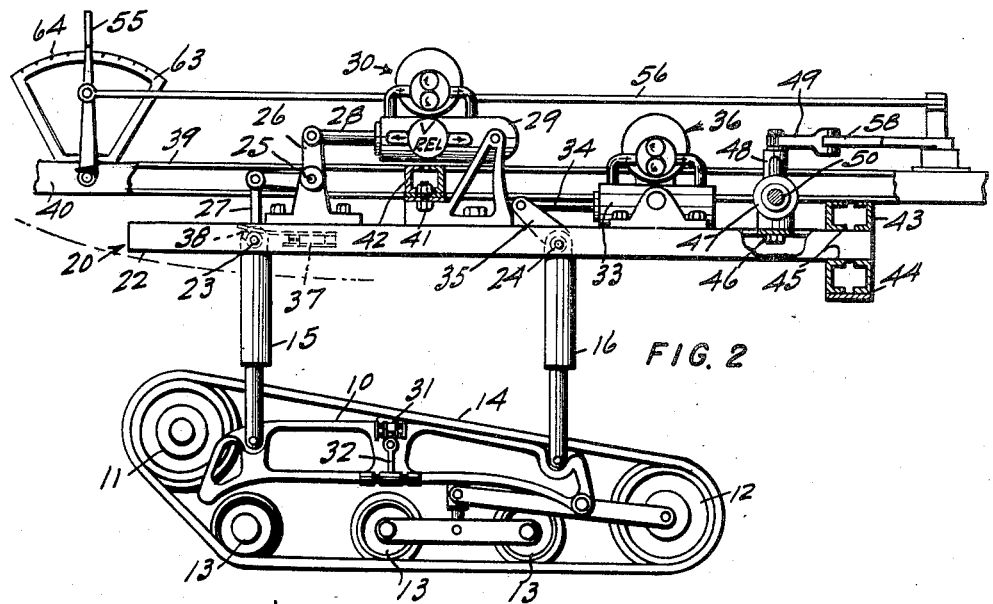
Fig. 2 is a side elevation of Fig. 1.

As illustrated in Figs. 1 and 2, the endless tread type of landing gear has a frame 10, toe and heel track wheels 11 and 12, and the conventional tread and tensioning wheels 13, and an endless tread 14, and with the landing gear supported by shock absorbing struts 15 and 16, all of which are well known in the art.

The previously mentioned application discloses an inner frame 17 having side members 18 and 19 and being an adjustable support, and an outer frame 20 having side members 21 and 22 suitably supported by the fuselage or wings of an airplane and being a fixed support; the forward struts 15 are pivotally supported by the shaft 23; the rear struts 16 are supported by the shaft 24 which passes through the rear end of the inner frame and has its ends pivotally supported in the outer frame 20.

A shaft 25 is supported by the outer frame and has a bell-crank lever 26 having connection 27 to the shaft 23 at one end, and the other end connected to the piston rod 28 which operates in the cylinder 29 which in turn is supported by the outer frame and suitably controlled and operated by a supply of fluid under pressure, as by a reversible pump and motor 30, and which in turn is controlled by a switch 31 which is controlled by a pendulum 32 to cause the landing gear to be maintained on an even keel or level irrespective of whether the airplane noses up or down.

Another cylinder 33 has a piston rod 34 connected to the rear struts 16 to retract and project the landing gear through the lever arms 35, and is operated through a supply of fluid under pressure as through the reversible pump and motor 36. A switch 37 controlled by a cam or finger 38 on one of the front struts 15 limits operation of the pump and motor 30 to the full projected position of the landing gear, so that the leveling means operates automatically when the landing gear is fully projected but is non-operative when the landing gear is partly or fully retracted. The pump and motor 33 is under manual control.

The mechanism so far described is fully disclosed in the application previously mentioned, and in the present case is modified to include means for moving the above described unit about a vertical axis to orient the landing gear with a landing strip while the plane noses into a crosswind.

In the present case, the support members 21 and 22 are no longer fixed, but are adjustable supports, being themselves supported by the fixed support members 39 and 40 which are suitably spaced to permit the desired angular movement of the landing gear supporting unit described supra, this unit being pivotally supported on a vertical axis at some convenient point as indicated at 41 by a cross-member 42 supported at its ends by the fixed support members 39 and 40 in a suspended position; and suitable transverse suppporting guide means such as the cross-beams 43 and 44 are supported by the fixed supports 39 and 40, with the rear end of the member 22 slidable therebetween as indicated at 45.

A cross member 46 has its opposite ends supported by the members 20 and 21 and has mounted thereon a cylinder 47 having a valve 48 operated by a control member such as a lever 49, from a remote point such as the pilot's compartment, and the cylinder has a piston rod 50 the end of which is attached to one of the support members 39 or 40, and a source of fluid under pressure indicated at 51 is provided for the cylinder through connections 52 and 53, a pump being indicated at 54 for delivering the fluid under pressure to the valve 48, and returning through the line 52.

As illustrated, a suitable control, such as a lever 55 is manually operable and is normally located on center as shown. This lever has a connection 56 with the valve lever 49 through a connecting rod 57 and bell-crank lever 58, this bell-crank lever being mounted in a fixed position such as on the crossbeam 59 which is supported by the fixed supports 39 and 40.

Figure 3:
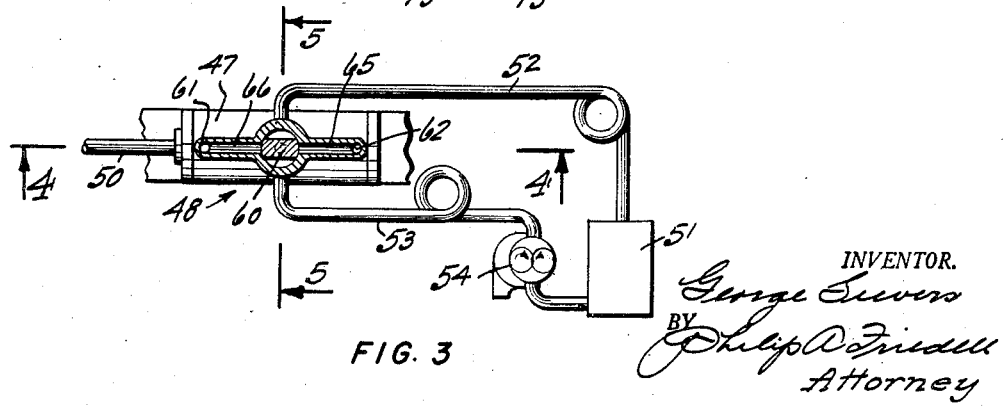
Fig. 3 is an enlarged view of one form of power operating means for the invention and corresponds to a section taken on line 3—3 of Fig. 4.
Figure 4:
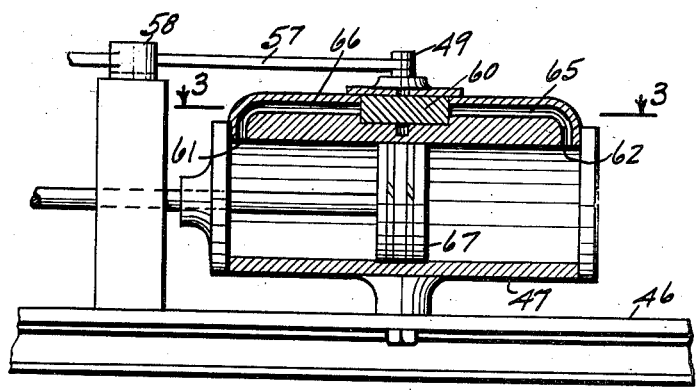
Fig. 4 is an enlarged vertical section through the power operating means taken on a line 4—4 of Fig. 3.
Figure 5:
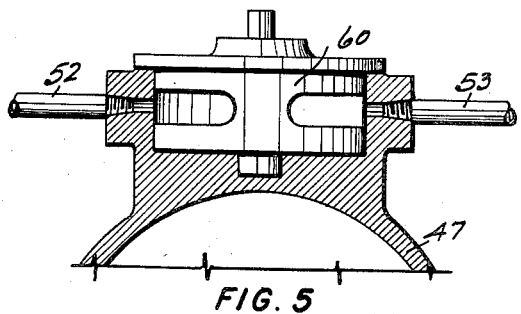
Fig. 5 is a further enlarged section through one type of control or follower valve and corresponds to a section taken on line 5—5 of Fig. 3.

The valve is clearly illustrated in Fig. 3, in which the valve block 60 is on dead center, corresponding to the dead center position of the manual control lever 55, the valve block closing both ports 61 and 62 at the respective ends of the cylinder. The quadrant 63 for the manual control lever may be graduated in degrees deflection as indicated at 64. With the lever on center, the valve block is on center and the landing gear is also held on center or in axial alignment with the axis of the aircraft.

If lever 55 is moved to the left, viewing Figs. 2 and 3, lever 49 is moved to the right, moving the valve block 60 to a diagonal position sloping toward the lower left hand end of the cylinder. This admits fluid under pressure through the manifold 65 through the port 62, while simultaneously opening the manifold 66 to the port 61, the fluid passing into the right hand end of the cylinder from the flexible pipe 53 and discharging from the left hand end. Since the piston 67 is anchored against movement, the cylinder is forced to the right carrying the landing gear support with it until the valve lever is again in the right angular position, stopping further movement, with the angularity of the landing gear agreeing with the angular adjustment of the lever 55. Thus, the adjustment of the landing gear follows the movement of the lever 55 in either direction.

Figure 6:
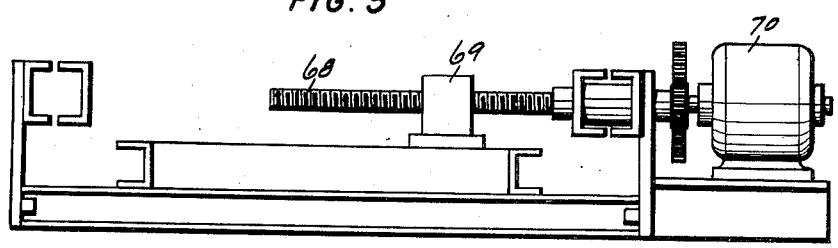
Fig. 6 shows a modification of the invention in which a screw adjustment operated by a reversible motor is used.

A modification of the power means for adjusting the landing gear is illustrated in Fig. 6 in which a screw 68 operates in a nut 69 and is operated by a reversible motor 70.

Figures 7, 8:
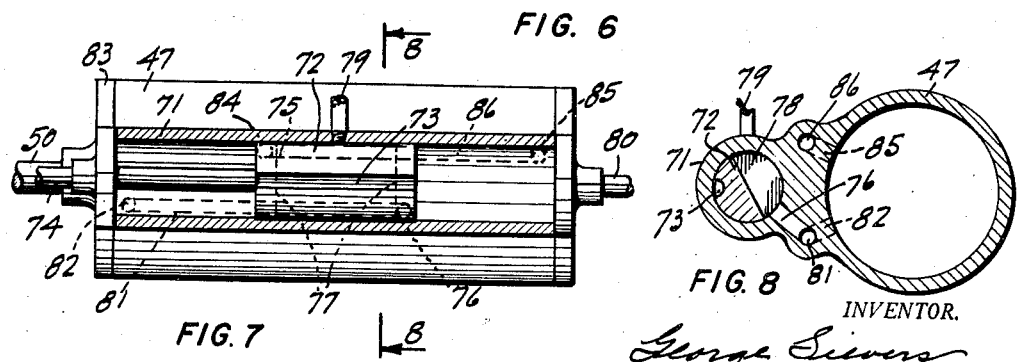
Fig. 7 shows a modified follower valve on an enlarged scale for use with the invention for control of the adjustments of the landing gear.
Fig. 8 is a section taken on line 8—8 of Fig. 7.

Figs. 7 and 8 illustrate a modification of the follow valve in which a piston-type valve is used and consists of a cylinder 71, a piston 72 having a passage 73 for equalizing the fluid pressure on both ends of the piston, and a piston rod 74 which is coupled to a control lever such as the control lever 55 and therefore is controlled in the same way as the previously described valve. In this case, the ports 75 and 76 are both closed by the respective solid ends of the piston, the portion between the dotted lines 77 being relieved as indicated at 78 in Fig. 8, and the cylinder having a discharge outlet 79 and an inlet 80.

As will be noted, if the piston 72 is moved slightly to the left viewing Fig. 7, the port 76 is partly uncovered by the right hand solid end of the piston and permits the high pressure fluid to flow through the port 76, along the passage 81 through the cylinder port 82, acting between the left hand end of the piston and the left hand cylinder head 83, forcing the cylinder 47 with its landing gear support to the left until the piston 72 again covers the port 76, and simultaneously the left hand solid end of the piston 72 uncovers the port 75 and permits the fluid in the right hand end of the cylinder to pass out of the port 85, passage 86, and port 84 into the space 78 and thence out through the conduit 79 to the supply tank or to atmosphere. Movement of the cylinder is immediately responsive to movement of the valve piston and will follow the valve piston with every movement. Since the pressure on opposite ends of the valve piston is equalized, very little effort is required to move the valve.

Figure 9:
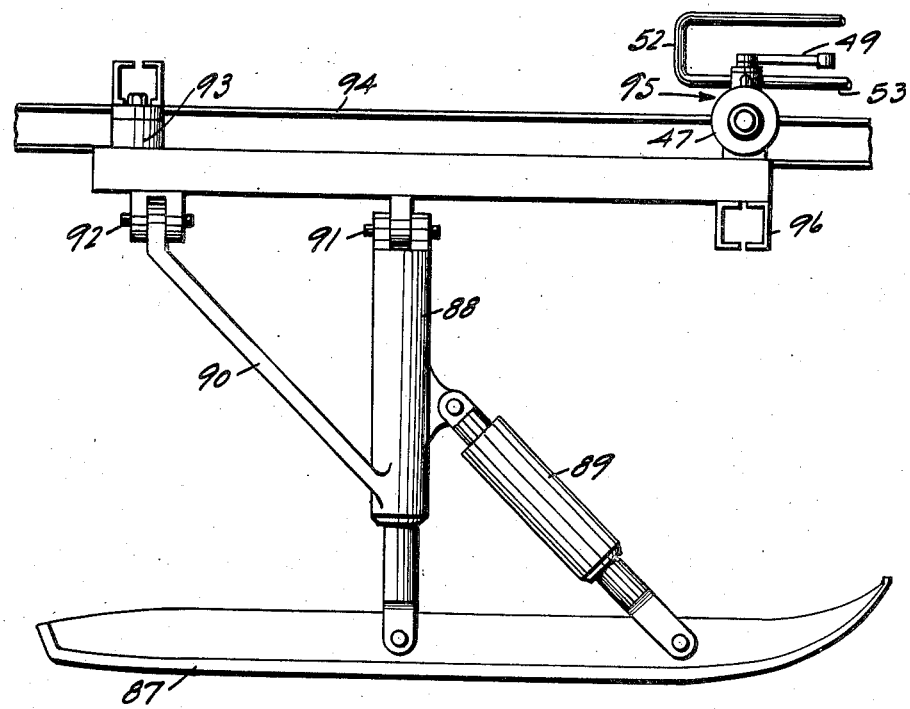
Fig. 9 shows the invention applied to a side retracting ski or skid type of landing gear.

Fig. 9 shows a ski or skid type of landing gear including the ski 87 with its fluid struts 88 and 89 with a brace 90 for the main strut 88, and with the main strut and brace pivoted on an axis parallel to that of the skid for lateral or side retraction as indicated at 91 and 92, the landing gear being supported similarly to that previously described, as by a pivot connection at 93 supported by the main fixed beams 94 and with the power operating mechanism 95 supported on one end of the landing gear support, and this landing gear support being slidably supported at that end on the cross member 96.

Figure 10:
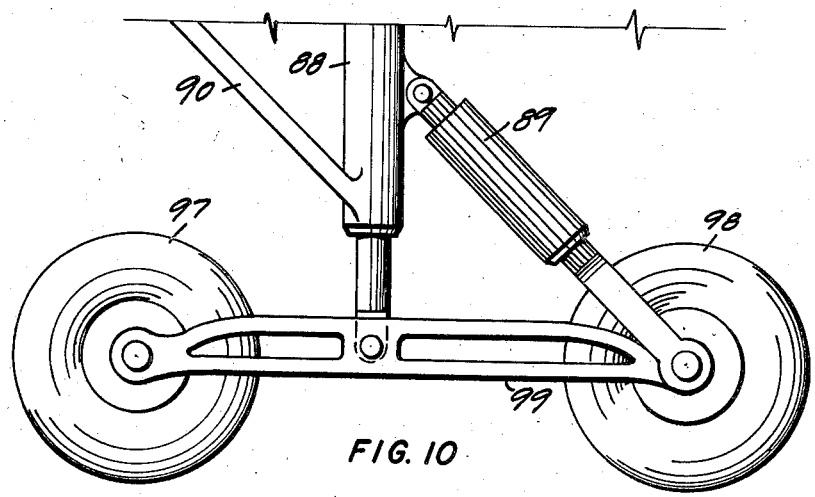
Fig. 10 shows a tandem wheel landing gear to which this invention may be applied, substituting for the ski in Fig. 9.

A single wheel landing gear, or the tandem type as shown in Fig. 10 can be mounted and operated in the same way as that shown in Fig. 9, and consists of the two wheels 97 and 98 connected by a spanning beam 99. These two types as shown in Figs. 9 and 10 may be installed with or without the tread leveling means for take-off and landing and is illustrated without that feature.

With the complete unit, the landing surface of any elongated type of landing gear will be maintained level automatically when the landing gear is projected, the landing gear can be projected and retracted at will, and the landing gear can be oriented with the landing strip while the airplane is headed into a cross wind during landing or take-off, and ruts or other obstructions will have no effect on the instant adjustment of the landing gear.

I claim:

1. Landing means for an airplane comprising; a first support fixed to the airplane; a second support pivotally supported by said first support on a vertical axis; a third support supported by said second support; a plurality of shock-absorbing struts having their upper ends hingedly supported by said third support; an elongated landing gear hingedly supported at the lower ends of said struts; power means cooperating between said first support and said second support for angularly adjusting said second and third supports and the landing gear supported thereby relative to the longitudinal axis of the airplane to coordinate the landing gear with a landing strip when the airplane is headed into a crosswind.

2. A structure as defined in claim 1; said third support comprising an elongated frame having one end hingedly mounted on a transverse axis in said second support, and power means cooperating between said second support and the other end of said third support for vertically adjusting said other end about its hinged support to adjust the landing gear parallel with the surface of the landing strip during landing and takeoff.

3. A structure as defined in claim 1; power means cooperating between said second support and said shock absorbing struts for retracting and projecting said landing gear at will.

4. A structure as defined in claim 1, said third support comprising an elongated frame having one end hingedly mounted on a transverse axis in said second support, and power means cooperating between said second support and the other end of said third support for vertically adjusting said other end about its hinged support to adjust the landing gear parallel with the surface of the landing strip during landing and takeoff; power means cooperating between said second support and said shock absorbing struts for retracting and projecting said landing gear at will.

GEORGE SIEVERS.

REFERENCES CITED

The following references are of record in the file of this patent:

UNITED STATES PATENTS

| Number | Name | Date |
| --- | --- | --- |
| 1,869,698 | Komfala | Aug. 2, 1932 |
| 2,062,296 | Centervall | Dec. 1, 1936 |
| 2,222,850 | Maclaren | Nov. 26, 1940 |
| 2,326,020 | Dowty | Aug. 3, 1943 |
| 2,372,710 | Chisholm | Apr. 3, 1945 |
| 2,395,671 | Kleinhans et al. | Feb. 26, 1946 |
| 2,474,630 | Jamison | June 28, 1949 |
| 2,502,802 | Sievers | Apr. 4, 1950 |
| 2,506,093 | MacDuff | May 2, 1950 |

FOREIGN PATENTS

| Number | Country | Date |
| --- | --- | --- |
| 432,868 | Great Britain | May 3, 1934 |